United States Patent [19]

Malmstrom et al.

[11] Patent Number: 4,558,636
[45] Date of Patent: Dec. 17, 1985

[54] PROTECTIVE SHELTER FLOW CONTROL APPARATUS

[75] Inventors: Herbert A. Malmstrom, Creve Coeur; Henry A. Roddiger, Lake St. Louis, both of Mo.

[73] Assignee: Engineered Air Systems, Inc., St. Louis, Mo.

[21] Appl. No.: 605,419

[22] Filed: Apr. 30, 1984

[51] Int. Cl.[4] ............................................. F24F 3/16
[52] U.S. Cl. ..................................... 98/39.1; 55/316; 55/337; 98/2.11; 98/116
[58] Field of Search .................. 98/2.01, 2.11, 33 R, 98/39, 116, 119, DIG. 2, DIG. 8; 55/316, 323, 330, 337, 312, 313, 385 A

[56] References Cited

U.S. PATENT DOCUMENTS

| 3,077,716 | 2/1963 | Wilson | 55/337 |
| 4,279,630 | 7/1981 | Hakamura et al. | 55/316 |
| 4,423,669 | 1/1984 | Bullock et al. | 98/415 VX |

FOREIGN PATENT DOCUMENTS

| 907379 | 3/1954 | Fed. Rep. of Germany | 98/39 |
| 849492 | 11/1939 | France | 98/DIG. 2 |
| 237341 | 4/1945 | Switzerland | 98/DIG. 2 |

Primary Examiner—Harold Joyce
Attorney, Agent, or Firm—Ralph B. Brick

[57] ABSTRACT

A flow control apparatus for a protective shelter including valve means to allow preselected maximum and minimum amounts of air flow into the shelter depending upon ambient contaminant concentrations.

7 Claims, 5 Drawing Figures

PROTECTIVE SHELTER FLOW CONTROL APPARATUS

BACKGROUND OF THE INVENTION

The present invention relates to an apparatus for controlling the flow of ambient air into a plenum and more particularly to an apparatus for controlling the flow of ambient air into a protective shelter such as a tank housing.

It has long been known in the art to provide a protective shelter in a contaminated atmosphere with ambient air flow control apparatus associated with the shelter designed to introduce and filter ambient air introduced into the shelter. Such a protective system arrangement can be found in the unexpired U.S. Pat. No. 3,766,844, issued to Thomas G. Donnelly, et al, on Oct. 23, 1973. It also has been known to control the flow of ambient air into a protective shelter arrangement in such a manner that ventilating air is introduced into the protective shelter through one shelter inlet opening during one mode of operation and filtered ambient air is introduced into the protective shelter through another shelter inlet opening during another mode of operation. Further, it is well known in the valve art to broadly provide a variable flow control arrangement utilizing a valve within a valve such as is disclosed in the now expired U.S. Pat. No. 3,232,315, issued to D. A. Morelli on Feb. 1, 1966 and the now expired U.S. Pat. No. 3,242,943, issued to R. W. Waterfill on Mar. 29, 1966. For the most part, however, the flow control arrangements utilized with protective shelters have been complex and extensive in construction, operation and maintenance and none appear to have utilized the valve-within-a-valve inlet arrangement in any form.

The present invention, recognizing the problems of the past, provides a straightforward protective shelter flow control apparatus which utilizes a valve-within-a-valve arrangement to reduce the number of parts involved providing an apparatus which is efficient and economical in construction, operation and maintenance and requiring a minimum of energy and space.

Although the apparatus of the present invention is here disclosed in use with an armored tank, it is to be understood that the apparatus of the present invention is not limited to use only for military purposes but also can be utilized in any other ambient environment including commercial situations where it is desirable to control air flow into a protective shelter during and after changes in ambient air conditions.

Various other features of the present invention will become obvious to one skilled in the art upon reading the description of the inventive apparatus set forth hereinafter.

SUMMARY OF THE INVENTION

More particularly, the present invention provides an ambient air flow control apparatus for a protective shelter comprising: a flow through air control housing having ambient air inlet means and outlet means adapted to communicate with inlet means in a protective shelter; a first ambient air flow passage disposed within the housing to permit a preselected maximum ambient air flow through the housing and into the shelter during periods of low contaminant concentration in the ambient air; a second ambient air flow passage disposed within the housing to permit a preselected minimum ambient air flow through the housing and into the shelter during periods of high contaminant concentration in the ambient air; and, valve means adjacent the air outlet means of the housing common to the first and second air flow passages to maintain the first passage closed and the second passage open to the shelter during periods of high contaminant concentration. In addition, the present invention provides a novel arrangement for maintaining the valve means closed and for moving the air through the housing into the shelter.

It is to be understood that various changes can be made by one skilled in the art in the arrangement, form and construction of the apparatus disclosed herein without departing from the scope or spirit of the present invention.

DESCRIPTION OF THE DRAWINGS

Referring to the drawings which disclose one advantageous embodiment of the present invention.

DESCRIPTION OF A PREFERRED EMBODIMENT

Figure 1:
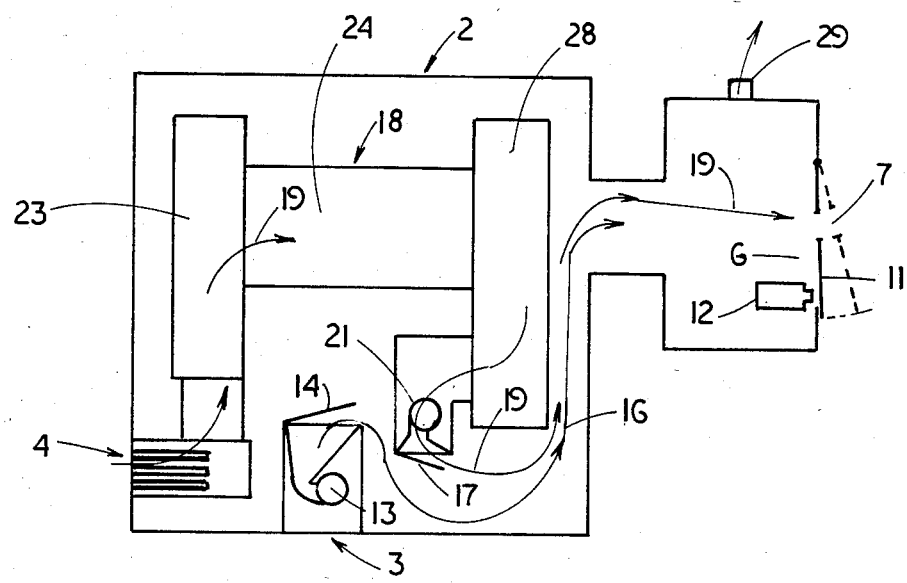
FIG. 1 is a schematic flow diagram of a flow control apparatus which discloses the novel features of the present invention.

Referring to FIG. 1 of the drawings, the inventive flow control apparatus is schematically disclosed to include a flow through housing 2 having upstream air inlets 3 and 4 at one end thereof and air outlets 6 and 7 at the other extremity thereof. It is to be noted that air outlet 6 is substantially larger than air outlet 7 which is disposed in a pivotal flap described hereinafter so as to permit maximum ambient air flow into the protective shelter with which it is connected when outlet 6 is open.

Figure 2:
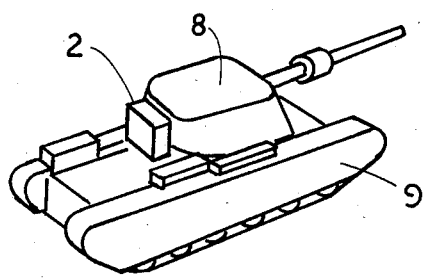
FIG. 2 is a reduced isometric view of a protective shelter in the form of a military tank showing the flow control apparatus mounted at the rear end of the tank crew compartment.

As can be seen in FIG. 2, housing 2 is arranged to communicate with the rear end of a tank crew compartment 8 of military tank 9, the crew compartment 8 providing a protective shelter for tank personnel.

Referring once again to FIG. 1, it can be seen that larger air outlet 6 is provided with pivotal flap 11 which serves to close outlet 6 from maximum ambient air flow during high contaminant or toxic concentrations in the ambient air. As aforenoted, flap 11 includes the smaller air outlet 7 (which, if desired, can also be provided with a smaller pivotal closing flap—not shown). Smaller air outlet 7 serves to provide a smaller amount of filtered ambient air to a protective shelter when high contaminant or toxic concentrations exist in the ambient air.

To maintain pivotal flap 11 in closed position during such high contaminant concentrations, an electromagnet 12 is arranged to cooperate with flap 11 when the magnet 12 is excited. It is to be understood that flap 11 can be formed from a suitable magnetically attractive metallic material or include a suitable appropriately positioned strip of such metallic material so as to be attracted by electromagnet 12 when the electromagnet is excited.

It is to be noted in FIG. 1, that positioned downstream of air inlet 3 in housing 2, is a vent fan 13 having a pivotally mounted damper 14 attached to the downstream housing of fan 13. When the fan 13 is energized, damper 14 is pushed open as is pivotal flap 11 by the air pressure in housing 2, thus providing an ambient air flow passage as indicated by the arrow marked by reference numeral 16, the air flow passage 16 connecting air inlet 3 to large air outlet 6 to permit a preselected maximum air flow through the housing 2 and into the protective shelter during periods of low or zero contamination to vent the shelter during such periods of little or negligible contaminant concentrations. It is to be noted that the pressure in housing 2 created by fan 13 also serves to close pivotally mounted backdraft damper 17 which is positioned at the extremity of a duct system 18 disposed in housing 2. Duct system 18 serves to define a second air flow passage between air inlet 4 and smaller air outlet 7 in pivotal damper 11, the second air flow passage being indicated by the arrow marked with reference numeral 19.

When vent fan 13 is deenergized during periods of high contaminant or toxic concentration in the ambient air, electromagnet 12 is energized to hold pivotal flap 11 in closed position. At the same time fan 21 positioned in duct system 18 is energized to hold open pivotal backdraft damper 17 and to cause a smaller amount of ambient air to flow from air inlet 4 through smaller air outlet 7 to permit a preselected minimum air flow through housing 2 and into the protective shelter when the flap 11 is held in closed position during periods of high contaminant concentration in the ambient air. It is to be understood that any one of a number of suitable electrical circuits (not shown) can be utilized to actuate the vent fan 13, fan 21 and electromagnet 12 in the sequence aforedescribed.

The flow control apparatus aforedescribed which can be actuated either automatically or manually serves to maintain a positive pressure within the protective shelter to which it is connected with all occurring leakage in the shelter flowing toward outside ambient. Suitable control switches, pressure sensing devices and alarms (not shown) can be provided in the protective shelter served by the flow control device.

Figure 3:
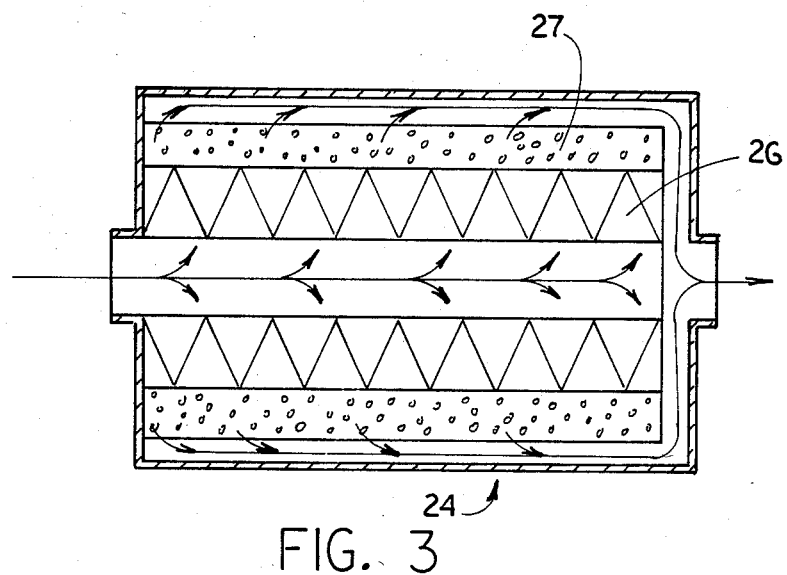
FIG. 3 is an enlarged cross-sectional view of a typical cylindrical filter assembly including a pleated filter and a downstream charcoal filter which can be utilized as part of the inventive flow control apparatus.
Figure 4:
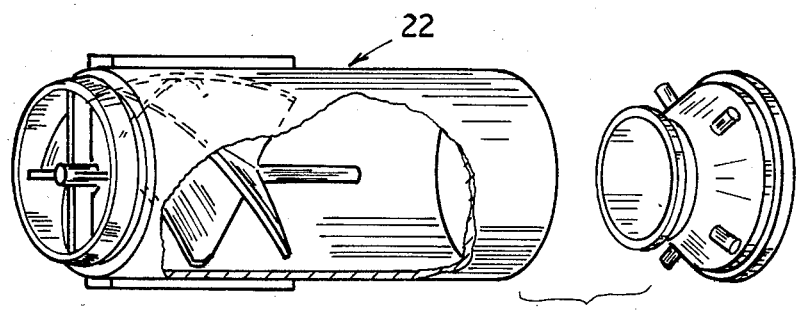
FIG. 4 is an enlarged exploded isometric view of one of a bank of tubular inertial separators which also can be utilized as part of the inventive flow control apparatus; and, FIG. 5 is a schematic electrical control circuit for the apparatus of FIGS. 1-4.

To remove the contaminants from the air of air flow passage 19, duct system 18 can include any one of a number of known filtering devices. A bank of spaced tubular inertial separators such as the inertial separator tube 22 of FIG. 4 can be positioned adjacent air inlet 4. From this bank of separators 22 which serve to remove larger particulates by centrifugal force, air flow passage 19 continues in duct system 18 to inlet plenum 23 through filter assembly housing 24 which can be of cylindrical type (FIG. 3) to include a pleated particulate filter media 26 of paper or fiberglass upstream of a cylindrically shaped activated carbon filter 27. The filtered air stream then passes through outlet plenum 28, fan 21 past damper 17 and through small air outlet 7 into the protective shelter. It is to be noted that in addition to small air outlet 7 another small outlet 29 can be provided. Such an outlet 29 can be connected by flexible ducting to various other stations that may exist in a protective shelter such as the tank compartment 8 disclosed in FIG. 2.

Figure 5:
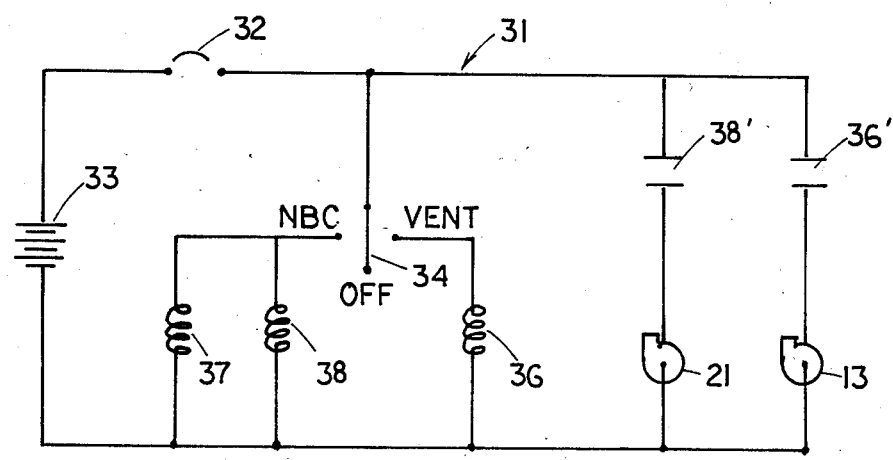

In a typical operation of the apparatus disclosed and referring to electrical circuit 31 of FIG. 5, when main circuit breaker 32 is moved to closed position, a suitable power source is supplied to control circuit 31 by battery 33. With switch 34 moved from "Off" to "Vent" position, the solenoid 36 is energized to close contact 36' and apply power to the motor of vent fan 13. At the same time the electromagnetic solenoid 37 is deenergized to deenergize electromagnet 12 (FIG. 1) allowing the damper 11 to open and causing the majority of vent air to move along air flow passage 16 to enter tank crew compartment 8. When switch 34 is moved to "NBC" closed position in circuit 31, the solenoids 37 and 38 are energized and solenoid 36 is deenergized. Electromagnet 12 is thus energized to hold damper 11 closed, it being noted that at the same time vent fan 13 does not operate but fan 21 does with the closing of contact 38' to force filtered air to move along air flow passage 19 and through small outlets 7 and 29.

The invention claimed is:

1. An ambient air flow control arrangement for a protective shelter comprising: a flow through air control housing having air inlet means at one end of said housing and at least two ambient air outlets at the other end of said housing adapted to communicate with a protective shelter, one of said air outlets being larger than the other with the larger air outlet permitting a preselected maximum ambient air flow into the protective shelter when open and the smaller air outlet permitting a preselected minimum ambient air flow into the protective shelter; valve means responsive to air flow cooperating with said ambient air outlets; valve holding means cooperative with said valve means to maintain said larger air outlet in closed position during periods of high contaminant concentration in the ambient air and to permit minimum air flow through said smaller air outlet; fan means cooperative with said air control housing to move ambient air therethrough; and filter means cooperative with said smaller air outlet to filter the air during minimum air flow operations through said smaller air outlet.

2. The apparatus of claim 1, said air flow responsive valve means comprising a pivotally mounted air responsive flap valve cooperatively mounted adjacent to said larger air outlet to control air flow therethrough, said flap valve having the smaller air outlet disposed therein to permit the preselected minimum ambient air flow into the protective shelter when in closed position.

3. The apparatus of claim 1, said air flow responsive valve means comprising a pivotally mounted air responsive flap valve cooperatively mounted adjacent to said larger air outlet to control air flow therethrough, said flap valve having the other air outlet disposed therein to permit the preselected minimum ambient air flow into the protective shelter when in closed position; said valve holding means including an electromagnet positioned adjacent said flap valve to directly engage and hold said flap valve in closed position when actuated.

4. The apparatus of claim 1, said filter means being disposed within said housing to filter the air during minimum air flow operations through said smaller air outlet, said filter means including a bank of upstream inertial separators, an intermediate pleated particulate filter member and a downstream charcoal filter member.

5. The apparatus of claim 1, said air inlet means comprising a pair of spaced air inlets; a first ambient air flow passage disposed within said housing connecting one of said air inlets with the larger of said air outlets to permit a preselected maximum air flow through said housing and into the protective shelter during periods of low contaminant concentration; and a second ambient air flow passage disposed within said housing connecting the other of said air inlets with the smaller of said air outlets to permit a preselected minimum filtered air flow through said housing into said shelter.

6. The apparatus of claim 5, said first and said second ambient air passages each including a motor driven fan with a pivotally mounted damper positioned downstream thereof, the fans and their respective dampers being positioned in opposed flow relationship and the fans being alternatively operable so that when the damper of one fan is forced open by fan air flow the damper of the other fan is forced closed.

7. An ambient air flow control arrangement for a protective shelter comprising: a flow through air control housing having a pair of spaced air inlets at one end of said housing and at least two ambient air outlets at the other end of said housing adapted to communicate with the protective shelter, one of said air outlets being larger than the other to permit maximum ambient air flow into the protective shelter when open with the other permitting a preselected minimum ambient air flow into the protective shelter; a pivotally mounted air responsive flap valve cooperatively mounted adjacent to said larger air outlet to control air flow therethrough, said flap valve having the other air outlet disposed therein to permit the preselected minimum ambient air flow into the protective shelter when in closed position; an electromagnet positioned adjacent said flap valve to directly engage and hold said valve in closed position when actuated; a first ambient air flow passage disposed within said housing connecting one of said air inlets with the larger of said air outlets to permit a preselected maximum air flow through said housing and into said shelter during periods of low contaminant concentration; a second ambient air flow passage disposed within said housing connecting the other of said air inlets with the smaller of said air outlets in said flap valve to permit a preselected minimum air flow through said housing and into said shelter when said flap valve is held in closed position during periods of high contaminant concentration in said ambient air; said first and second ambient air passages each including a motor driven fan having a pivotally mounted flap damper positioned downstream thereof with the dampers so arranged that when the damper of one fan is forced open the other is closed; and a filter system disposed in said second ambient air flow passage including a bank of upstream inertial separators, an intermediate pleated particulate filter member and a downstream charcoal filter member.

* * * * *